(12) United States Patent
Nguyen

(10) Patent No.: US 9,024,467 B2
(45) Date of Patent: May 5, 2015

(54) DC POWER ARCHITECTURE FOR REMOTE APU START

(75) Inventor: Phuoc D. Nguyen, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 529 days.

(21) Appl. No.: 13/526,553

(22) Filed: Jun. 19, 2012

(65) Prior Publication Data

US 2013/0334875 A1   Dec. 19, 2013

(51) Int. Cl.
  *B60L 1/00*   (2006.01)
  *B64D 41/00*   (2006.01)
  *F02N 11/08*   (2006.01)

(52) U.S. Cl.
  CPC ............ *B64D 41/00* (2013.01); *F02N 11/0807* (2013.01); *F05D 2220/50* (2013.01); *F05D 2260/85* (2013.01)

(58) Field of Classification Search
  USPC .......................................................... 307/9.1
  See application file for complete search history.

(56) References Cited

U.S. PATENT DOCUMENTS

2004/0160340 A1 * 8/2004 Thomson et al. ............. 340/945

\* cited by examiner

*Primary Examiner* — Robert Deberadinis
(74) *Attorney, Agent, or Firm* — Ameh IP; Lowell Campbell; Elahe Toosi

(57) ABSTRACT

A circuit and methods for remote auxiliary power unit startup are presented. A first node is coupled to a ground by action of a momentary switch to initiate an activation, and the first node is coupled to the ground by action of a latching relay in response to the activation. An auxiliary power unit is coupled to a hot battery by action of a bi-polar relay in response to the activation.

20 Claims, 4 Drawing Sheets

DC POWER ARCHITECTURE FOR REMOTE APU START

FIELD

Embodiments of the present disclosure relate generally to circuits. More particularly, embodiments of the present disclosure relate to engine starting circuits.

BACKGROUND

Auxiliary power units (APU)s are devices on vehicles such as aircraft that provide an auxiliary source of electrical power in addition to or in absence of ground power (e.g., when an aircraft is at a gate or parked) or main engine generators (e.g., during taxi or in flight). Generally, APUs are found on commercial aircraft, and larger land and water vehicles such as tanks, trucks, and ships. An aircraft APU for running aircraft electrical systems may generally produce a 28V DC current or a 400 Hz AC current at a voltage of 115V.

SUMMARY

A circuit and methods for remote auxiliary power unit (APU) startup are presented. A first node is coupled to a ground by action of a momentary switch to initiate an activation, and the first node is coupled to the ground by action of a latching relay in response to the activation. An auxiliary power unit is coupled to a hot battery by action of a bi-polar relay in response to the activation.

In this manner, an APU can be started remotely via an exterior control such as a remote start switch near a crew entry door of a cold and dark airplane. The APU start control circuits, APU fire protection circuits and related fuel circuits are powered by a hot battery bus to start the APU when the external remote start switch is momentarily pressed on. The power source of related circuits will be switched back to a main battery bus when the flight crew/operator turns on the main battery switch or bring AC power online.

In an embodiment, a remote auxiliary power unit startup circuit comprises a momentary switch, a latching relay, a bi-polar relay, and an unlatching relay. The momentary switch couples a first node to a ground to initiate an activation. The latching relay couples the first node to the ground in response to the activation, and decouples the first node from the ground in response to a deactivation of a second node. The bi-polar relay couples an auxiliary power unit to a hot battery in response to the activation, and to a main power bus in response to the deactivation. The unlatching relay couples the second node to the hot battery, and initiates the deactivation by decoupling the second node from the hot battery in response to the auxiliary power unit starting.

In another embodiment, a method for remote auxiliary power unit startup couples a first node to a ground by action of a momentary switch to initiate an activation. The method further couples the first node to the ground by action of a latching relay in response to the activation, and couples an auxiliary power unit to a hot battery by action of a bi-polar relay in response to the activation.

In a further embodiment, a method for providing a remote auxiliary power unit startup circuit provides a momentary switch operable to couple a first node to a ground to initiate an activation. The method further provides a latching relay that couples the first node to the ground in response to the activation, and decouples the first node from the ground in response to a deactivation of a second node. The method further provides a bi-polar relay that couples an auxiliary power unit to a hot battery in response to the activation, and to a main power bus in response to the deactivation. The method further provides an unlatching relay that couples the second node to the hot battery, and that initiates the deactivation of the second node by decoupling the second node from the hot battery in response to the auxiliary power unit starting.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to electronic circuits, electronic devices, auxiliary power units, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a non-limiting application, namely, an aircraft auxiliary power unit starting circuit. Embodiments of the disclosure, however, are not limited to such aircraft auxiliary power unit starting circuit applications, and the techniques described herein may also be utilized in other applications. For example but without limitation, embodiments may be applicable to train auxiliary power units, ship auxiliary power units, generators, or other engine starting application.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

An auxiliary power unit (APU) can be started remotely via an exterior control such as a remote start switch near a crew entry door of a cold & dark airplane. An APU start control circuit and/or other APU controller, APU fire protection circuits and related fuel circuits are powered by a hot battery bus to start the APU when the external remote start switch is momentarily pressed on. The power source of related circuits will be switched back to a main battery bus when flight crew/operator turns on a main battery switch or bring AC power online.

Figure 1:
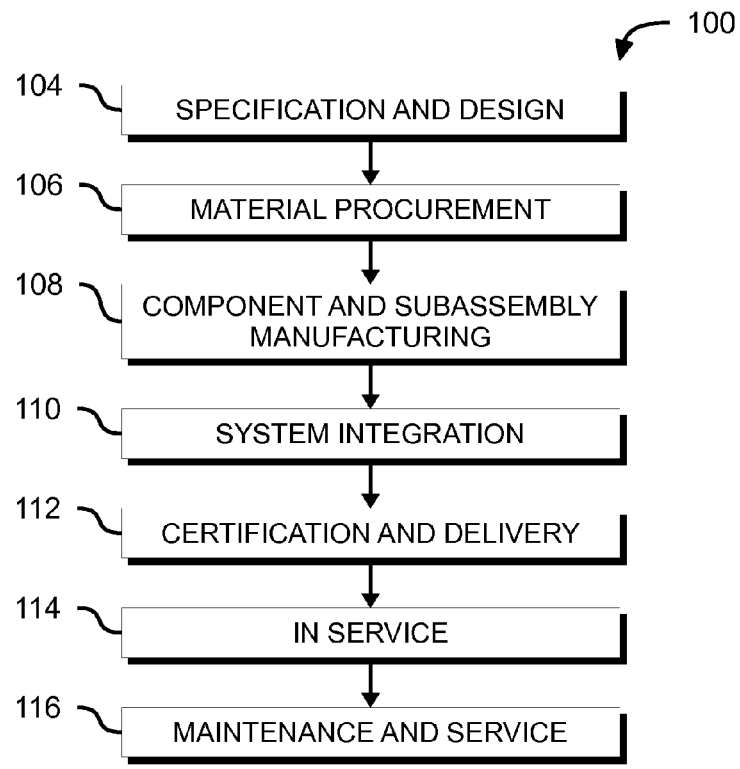
FIG. 1 is an illustration of a flow diagram of an exemplary aircraft production and service methodology.
Figure 2:
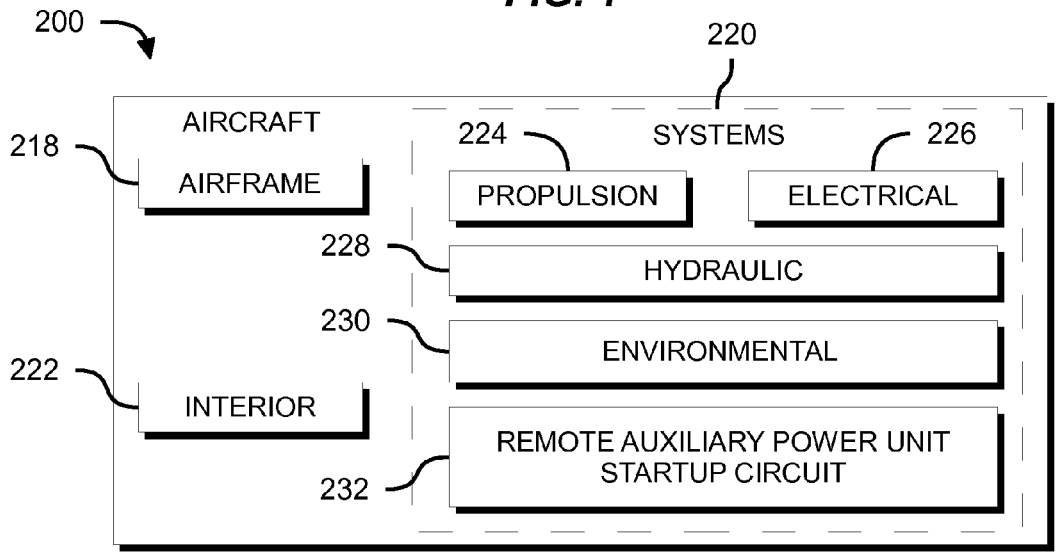
FIG. 2 is an illustration of an exemplary block diagram of an aircraft.

Referring more particularly to the drawings, embodiments of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 1, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental system 230, and a remote auxiliary power unit startup circuit 232. Any number of other systems may also be included. Although an aerospace example is shown, the embodiments of the disclosure may be applied to other industries.

Apparatus and methods embodied herein may be employed during any one or more of the stages of the method 100. For example, components or subassemblies corresponding to production of the process 108 may be fabricated or manufactured in a manner similar to components or subassemblies produced while the aircraft 200 is in service. In addition, one or more apparatus embodiments, method embodiments, or a combination thereof may be utilized during production stages of the process 108 and the system integration 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Figure 3:
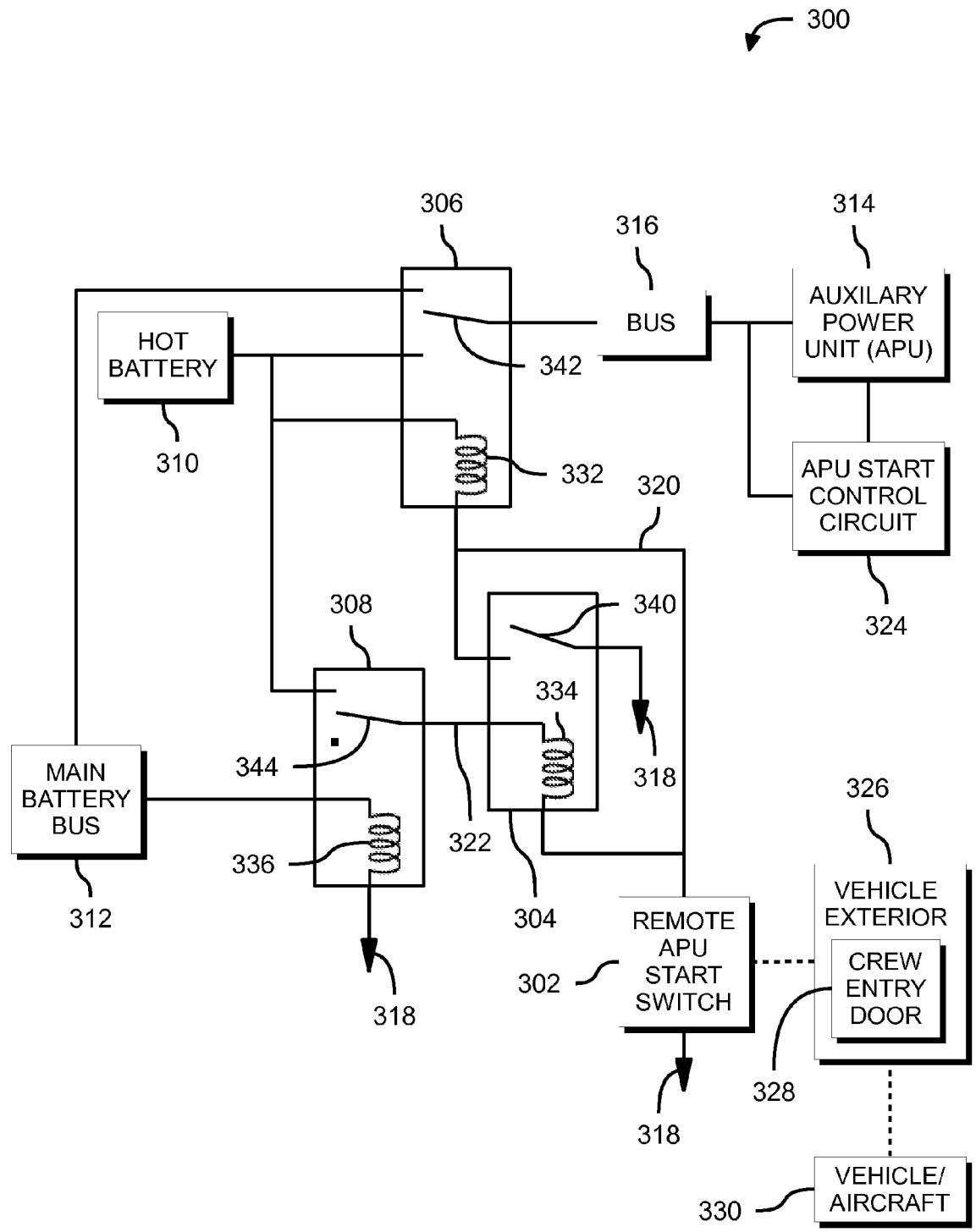
FIG. 3 is an illustration of an exemplary remote auxiliary power unit startup circuit according to an embodiment of the disclosure.

FIG. 3 is an illustration of an exemplary remote auxiliary power unit startup circuit 300 according to an embodiment of the disclosure. The circuit 300 may comprise a momentary switch 302, a latching relay 304, a bi-polar relay 306, an unlatching relay 308, a hot battery 310, a main battery bus 312, an auxiliary power unit (APU) 314, and an APU start control circuit 324.

The momentary switch 302 (remote APU start switch 302) is configured to couple a first node 320 to a ground 318 to initiate an activation. The momentary switch 302 closes to couple the first node 320 to the ground 318, and re-opens (releases) in a short period of time removing the coupling of the first node 320 to the ground 318 through the momentary switch 302. For example but without limitation, for a manual operation, the momentary switch 302 closes when a button is pressed, and re-opens when the button is released (e.g., about 1-2 seconds). The momentary switch 302 may be operated by, for example but without limitation, a remote operation, a local operation, a wireless operation, an infrared operation, a pressed button, manual operation, or other type of operation. The momentary switch 302 may comprise, for example but without limitation, a momentary contact switch, a momentary single pole single throw switch, a bounce switch, or other switch.

The activation may comprise activation of the bi-polar relay 306 and the latching relay 304. Coupling the first node 320 to the ground 318 initiates starting the APU 314 by activating the bi-polar relay 306 and the latching relay 304. The momentary switch 302 may activate the bi-polar relay 306 by, for example but without limitation, coupling a coil 332 of the bi-polar relay 306 to the ground 318. Thereby, a current flows from the hot battery 310 through the coil 332 to the ground 318 causing the bi-polar relay 306 to couple the APU 314 to the hot battery 310 (e.g., via a bus 316). Coupling the APU 314 to the hot battery 310 starts the APU 314.

The momentary switch 302 may activate the latching relay 304 by, for example but without limitation, coupling a coil 334 of the latching relay 304 to the ground 318. Thereby, a current flows from the hot battery 310 through the coil 334 to the ground 318 causing the latching relay 304 to couple the coil 332 of the bi-polar relay 306 to the ground 318. Thereby, the coil 332 of the bi-polar relay 306 can remain coupled to the ground 318 after the momentary switch 302 re-opens and until the latching relay 304 is deactivated, which decouples the coil 332 of the bi-polar relay 306 from the ground 318.

The latching relay 304 is configured to couple the first node 320 to the ground 318 in response to the activation. The latching relay 304 is further configured to decouple the first node 320 from the ground 318 in response to a deactivation of a second node 322. For example but without limitation, the latching relay 304 may comprise a single pole single throw switch 340 (shown in an open position) controlled by the coil 334, or other switch configuration. The latching relay 304 is activated when a current flows through the coil 334. When the current flows through the coil 334, the single pole single throw switch 340 couples the first node 320 and the coil 332 of the bi-polar relay 306 to the ground 318. Thereby, the bi-polar relay 306 is activated or remains activated.

The latching relay 304 is deactivated when the current does not flow through the coil 334, e.g., when the second node 322 is deactivated by decoupling from the hot battery 310. When the current does not flow through the coil 334, the single pole single throw switch 340 decouples the first node 320 and the coil 332 of the bi-polar relay 306 from the ground 318. Thereby, the bi-polar relay 306 is deactivated.

The bi-polar relay 306 is configured to couple the APU 314 and the APU start control circuit 324 to the hot battery 310 in response to the activation. The bi-polar relay 306 is further configured to couple the APU 314 to the main battery bus 312 in response to the deactivation. For example but without limitation, the bi-polar relay 306 may comprise a single pole double throw switch 342 (shown in an open position) controlled by the coil 332, or other switch configuration. The bi-polar relay 306 is activated when a current flows through the coil 332. When the current flows from the hot battery 310 through the coil 332 to the ground 318, the single pole double throw switch 342 couples the APU 314 and the APU start control circuit 324 to the hot battery 310.

The bi-polar relay 306 is deactivated when the current does not flow through the coil 332, e.g., when the latching relay 304 is deactivated decoupling the coil 332 from the ground 318. When the current does not flow from the hot battery 310 through the coil 332 to the ground 318, the single pole double throw switch 342 couples the APU 314 and the APU start control circuit 324 to the main battery bus 312.

The unlatching relay 308 is configured to couple the second node 322 to the hot battery 310. The unlatching relay 308 is further configured to initiate the deactivation of the second node 322 by decoupling the second node 322 from the hot battery 310 in response to the APU 314 starting. For example but without limitation, the unlatching relay 308 may comprise a single pole double throw switch 344 (shown in an open position) controlled by a coil 336, or other switch configuration. When a current flows from the main battery bus 312 (e.g., when the main battery bus 312 has power because the APU has started) through the coil 336 to the ground 318, the single pole double throw switch 344 decouples the hot battery 310 from the second node 322 and the coil 334 of the latching relay 304. The coil 334 of the latching relay 304 is thereby deactivated (unpowered) and the single pole single throw switch 340 opens.

When the current does not flow from the main battery bus 312 through the coil 336 to the ground 318, the single pole double throw switch 344 couples the hot battery 310 to the second node 322 and the coil 334 of the latching relay 304. As a result, the coil 334 of the latching relay 304 is under control of the momentary switch 302 which controls a path to the ground 318 for a current to flow from the hot battery 310 through the coil 334.

The hot battery 310 may comprise, for example but without limitation, a nickel metal hydride battery, a lithium battery, a lithium ion battery, or other battery. The hot battery 310 may comprise a battery comprising electrical power or charged with electrical power.

The main battery bus 312 may comprise, for example but without limitation, a main aircraft electrical bus, an auxiliary electrical bus, a train power bus, or other power bus. The main battery bus 312 may be coupled to the APU 314 and energized with electrical energy when the APU 314 has been started (e.g., is operating).

The auxiliary power unit (APU) 314 may comprise, for example but without limitation, a diesel engine, a fuel cell, or other engine. The APU 314 may also comprise the APU start control circuit 324. The auxiliary power unit (APU) 314 is operable to start when coupled to the hot battery 310.

The APU start control circuit 324 is operable to initiate and control a start sequence of the APU 314. The APU start control circuit 324 may comprise, for example but without limitation, an APU controller, an APU fire protection circuit, fuel control circuits, an APU electronic control unit, or other APU related circuits.

Figure 4:
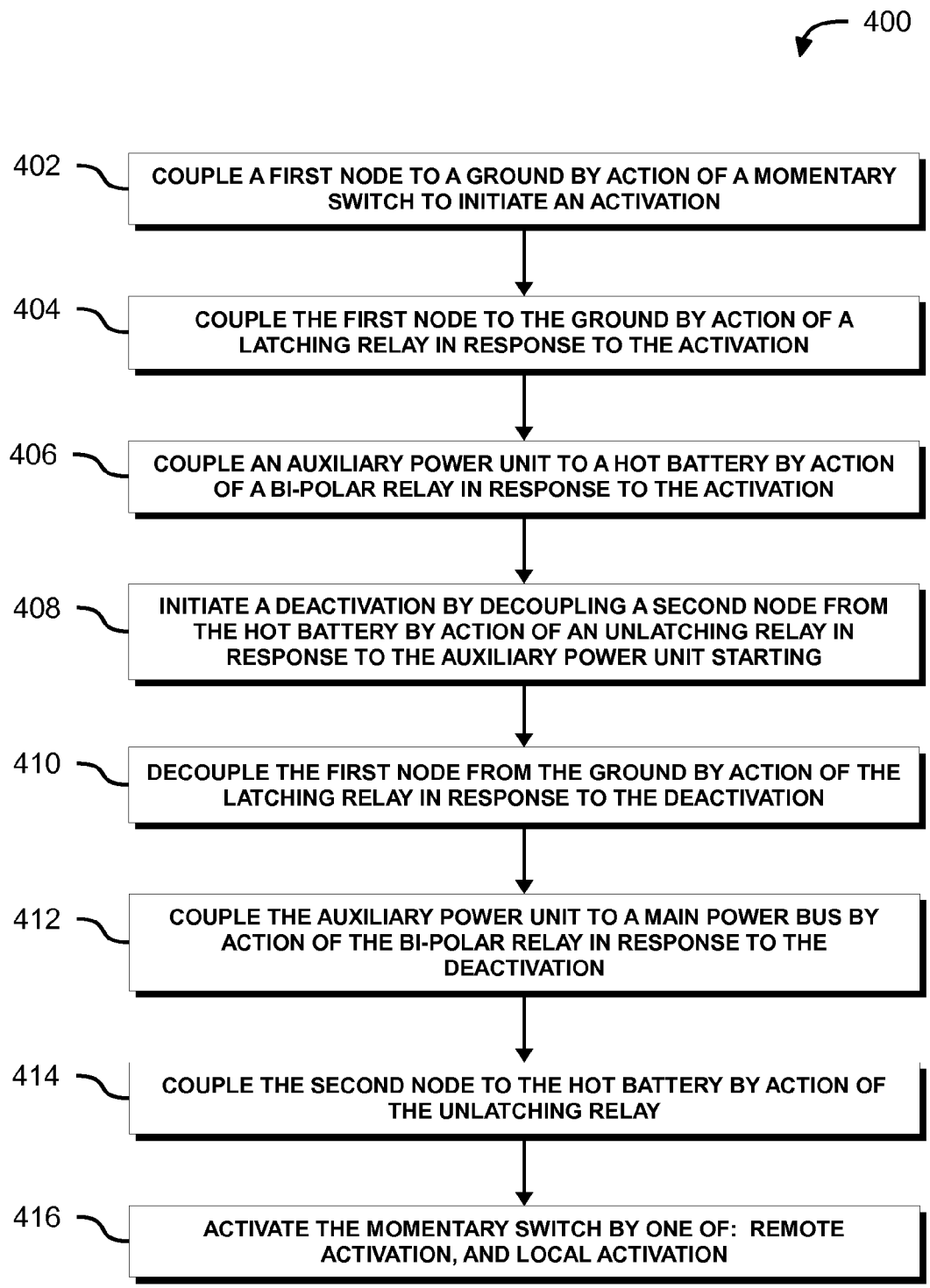
FIG. 4 is an illustration of an exemplary flowchart showing a process for remote auxiliary power unit startup according to an embodiment of the disclosure.

FIG. 4 is an illustration of an exemplary flowchart showing a process 400 for remote auxiliary power unit startup according to an embodiment of the disclosure. The various tasks performed in connection with process 500 may be performed mechanically, by software, hardware, firmware, computer-readable software, computer readable storage medium, or any combination thereof. It should be appreciated that process 400 may include any number of additional or alternative tasks, the tasks shown in FIG. 4 need not be performed in the illustrated order, and the process 400 may be incorporated into a more comprehensive procedure or process having additional functionality not described in detail herein.

For illustrative purposes, the following description of process 400 may refer to elements mentioned above in connection with FIG. 3. In some embodiments, portions of the process 400 may be performed by different elements of the circuit 300 such as: the momentary switch 302, the latching relay 304, the bi-polar relay 306, the unlatching relay 308, the hot battery 310, the main battery bus 312, etc. It should be appreciated that process 400 may include any number of additional or alternative tasks, the tasks shown in FIG. 4 need not be performed in the illustrated order, and the process 400 may be incorporated into a more comprehensive procedure or process having additional functionality not described in detail herein.

Process 400 may begin by coupling a first node such as the first node 320 to a ground such as the ground 318 by action of a momentary switch such as the momentary switch 302 to initiate an activation (task 402).

Process 400 may continue by coupling the first node 320 to the ground 318 by action of a latching relay such as the latching relay 304 in response to the activation (task 404).

Process 400 may continue by coupling an auxiliary power unit such as the APU 314 to a hot battery such as the hot battery 310 by action of a bi-polar relay such as the bi-polar relay 306 in response to the activation (task 406). The APU 314 comprises the APU start control circuit 324 that is also coupled to the hot battery 310 by the action of the bi-polar relay 306.

Process 400 may continue by initiating a deactivation by decoupling a second node such as the second node 322 from the hot battery 310 by action of an unlatching relay such as the unlatching relay 308 in response to the auxiliary power unit 314 starting (task 408).

Process 400 may continue by decoupling the first node 320 from the ground 318 by action of the latching relay 304 in response to the deactivation (task 410).

Process 400 may continue by coupling the auxiliary power unit 314 to a main power bus such as the main battery bus 312 by action of the bi-polar relay 306 in response to the deactivation (task 412).

Process 400 may continue by coupling the second node 322 to the hot battery 310 by action of the unlatching relay 308 (task 414).

Process 400 may continue by activating the momentary switch 302 by one of: remote activation, and local activation (task 416). The momentary switch may be located on an exterior 326 of a vehicle 330. The momentary switch may be located on near a crew entry door 328 of the vehicle 330, wherein the vehicle 330 comprises an aircraft 330.

Figure 5:
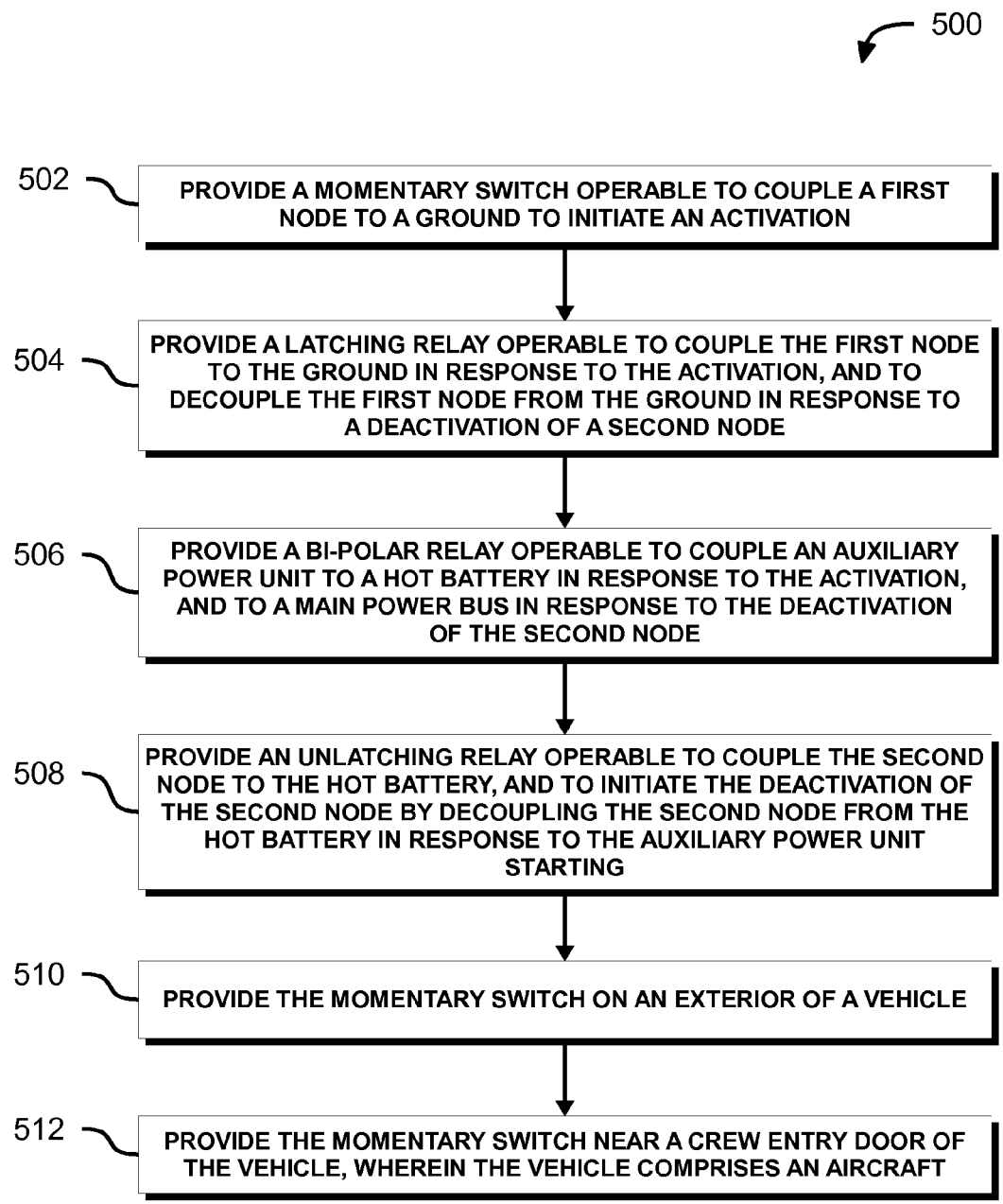
FIG. 5 is an illustration of an exemplary flowchart showing a process for providing a remote auxiliary power unit startup circuit according to an embodiment of the disclosure.

FIG. 5 is an illustration of an exemplary flowchart showing a process 500 for providing a remote auxiliary power unit startup circuit according to an embodiment of the disclosure. The various tasks performed in connection with process 500 may be performed mechanically, by software, hardware, firmware, computer-readable software, computer readable storage medium, or any combination thereof. It should be appreciated that process 500 may include any number of additional or alternative tasks, the tasks shown in FIG. 5 need not be performed in the illustrated order, and the process 500 may be incorporated into a more comprehensive procedure or process having additional functionality not described in detail herein.

For illustrative purposes, the following description of process 500 may refer to elements mentioned above in connection with FIG. 3. In some embodiments, portions of the process 500 may be performed by different elements of the circuit 300 such as: the momentary switch 302, the latching relay 304, the bi-polar relay 306, the unlatching relay 308, the hot battery 310, the main battery bus 312, etc. It should be appreciated that process 500 may include any number of additional or alternative tasks, the tasks shown in FIG. 5 need not be performed in the illustrated order, and the process 500 may be incorporated into a more comprehensive procedure or process having additional functionality not described in detail herein.

Process 500 may begin by providing a momentary switch such as the momentary switch 302 operable to couple a first node such as the first node 320 to a ground such as the ground 318 to initiate an activation (task 502). The momentary switch 302 may be located, for example but without limitation, on an exterior of a vehicle. For example, the momentary switch 302 may be located on the exterior 326 near the crew entry door 328 of the aircraft 330. The momentary switch may be activated remotely or locally by an operator.

Process 500 may continue by providing a latching relay such as the latching relay 304 operable to couple the first node 320 to the ground 318 in response to the activation, and decouple the first node 320 from the ground 318 in response to a deactivation of a second node such as the second node 322 (task 504).

Process 500 may continue by providing a bi-polar relay such as the bi-polar relay 306 operable to couple an auxiliary power unit such as the APU 314 to a hot battery such as the hot battery 310 in response to the activation, and a main power bus such as the main battery bus 312 in response to the deactivation of the second node 322 (task 506).

Process 500 may continue by providing an unlatching relay such as the unlatching relay 308 operable to couple the second node 322 to the hot battery 310, and initiate the deactivation of the second node 322 by decoupling the second node 322 from the hot battery 310 in response to the auxiliary power unit 314 starting (task 508).

Process 500 may continue by providing the momentary switch 302 on an exterior such as the exterior 326 of a vehicle such as the vehicle 330 (task 510).

Process 500 may continue by providing the momentary switch 302 near a crew entry door such as the crew entry door 328 of the vehicle 330, wherein the vehicle 330 comprises an aircraft such as the aircraft 330 (task 512).

In this manner, an APU can be started remotely via an exterior control such as a momentary switch near a crew entry door of a cold & dark airplane.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIG. 3 depicts example arrangements of elements, additional intervening elements, devices, features, or components may be present in an embodiment of the disclosure.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A remote auxiliary power unit startup circuit comprising:
   a momentary switch operable to couple a first node to a ground to initiate an activation;
   a latching relay operable to:
      couple the first node to the ground in response to the activation; and
      decouple the first node from the ground in response to a deactivation of a second node;
   a bi-polar relay operable to couple an auxiliary power unit to:
      a hot battery in response to the activation; and
      a main power bus in response to the deactivation; and
   an unlatching relay operable to:
      couple the second node to the hot battery; and
      initiate the deactivation by decoupling the second node from the hot battery in response to the auxiliary power unit starting.

2. The remote auxiliary power unit startup circuit of claim 1, wherein coupling the hot battery to the auxiliary power unit starts the auxiliary power unit.

3. The remote auxiliary power unit startup circuit of claim 1, wherein the momentary switch is located on an exterior of a vehicle.

4. The remote auxiliary power unit startup circuit of claim 3, wherein the vehicle comprises an aircraft and the momentary switch is located near a crew entry door of the aircraft.

5. The remote auxiliary power unit startup circuit of claim 1, wherein the momentary switch is activated by one of: remote activation, and local activation.

6. The remote auxiliary power unit startup circuit of claim 1, wherein the auxiliary power unit comprises an APU start control circuit.

7. A method for remote auxiliary power unit startup, the method comprising:
    coupling a first node to a ground by action of a momentary switch to initiate an activation;
    coupling the first node to the ground by action of a latching relay in response to the activation; and
    coupling an auxiliary power unit to a hot battery by action of a bi-polar relay in response to the activation.

8. The method of claim 7, further comprising:
    initiating a deactivation by decoupling a second node from the hot battery by action of an unlatching relay in response to the auxiliary power unit starting;
    decoupling the first node from the ground by action of the latching relay in response to the deactivation; and
    coupling the auxiliary power unit to a main power bus by action of the bi-polar relay in response to the deactivation.

9. The method of claim 8, further comprising coupling the second node to the hot battery by action of the unlatching relay.

10. The method of claim 7, further comprising activating the momentary switch by one of: remote activation, and local activation.

11. The method of claim 7, wherein the step of coupling the auxiliary power unit to the hot battery starts the auxiliary power unit.

12. The method of claim 7, wherein the momentary switch is located on an exterior of a vehicle.

13. The method of claim 12, wherein the momentary switch is located near a crew entry door of the vehicle, wherein the vehicle comprises an aircraft.

14. The method of claim 7, wherein the auxiliary power unit comprises an APU start control circuit.

15. A method for providing a remote auxiliary power unit startup circuit, the method comprising:
    providing a momentary switch operable to couple a first node to a ground to initiate an activation;
    providing a latching relay operable to:
        couple the first node to the ground in response to the activation; and
        decouple the first node from the ground in response to a deactivation of a second node;
    providing a bi-polar relay operable to couple an auxiliary power unit to:
        a hot battery in response to the activation; and
        a main power bus in response to the deactivation of the second node; and
    providing an unlatching relay operable to:
        couple the second node to the hot battery; and
        initiate the deactivation of the second node by decoupling the second node from the hot battery in response to the auxiliary power unit starting.

16. The method of claim 15, wherein coupling the auxiliary power unit to the hot battery starts the auxiliary power unit.

17. The method of claim 15, further comprising providing the momentary switch on an exterior of a vehicle.

18. The method of claim 17, further comprising providing the momentary switch near a crew entry door of the vehicle, wherein the vehicle comprises an aircraft.

19. The method of claim 15, wherein the momentary switch is activated by one of: remote activation, and local activation.

20. The method of claim 15, wherein the auxiliary power unit comprises an APU start control circuit.

\* \* \* \* \*